(12) United States Patent
Kress

(10) Patent No.: US 7,450,271 B2
(45) Date of Patent: Nov. 11, 2008

(54) SYSTEM AND METHOD FOR OPTIMIZING IMAGE OUTPUT QUALITY

(75) Inventor: William C. Kress, Mission Viejo, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 791 days.

(21) Appl. No.: 10/975,938

(22) Filed: Jan. 31, 2005

(65) Prior Publication Data

US 2006/0170977 A1 Aug. 3, 2006

(51) Int. Cl.
*H04N 1/409* (2006.01)
(52) U.S. Cl. .................................... 358/3.26; 382/274
(58) Field of Classification Search ................ 358/3.23, 358/3.26, 3.27, 523; 382/254, 274
See application file for complete search history.

(56) References Cited

U.S. PATENT DOCUMENTS

| | | | |
|---|---|---|---|
| 5,982,379 A | 11/1999 | Suzuki et al. | |
| 6,064,396 A | 5/2000 | Ouchi et al. | |
| 6,130,763 A | 10/2000 | Ohta et al. | |
| 6,262,812 B1 | 7/2001 | Chan et al. | |
| 6,771,839 B2 * | 8/2004 | Westerman | 382/274 |
| 2002/0044292 A1 | 4/2002 | Yamada et al. | |
| 2002/0149806 A1 | 10/2002 | Westerman | |
| 2003/0189650 A1 | 10/2003 | Gindele et al. | |
| 2004/0001228 A1 | 1/2004 | Goto et al. | |
| 2004/0036704 A1 | 2/2004 | Han et al. | |

* cited by examiner

*Primary Examiner*—Thomas D Lee
(74) *Attorney, Agent, or Firm*—Tucker Ellis & West, LLP

(57) ABSTRACT

The present invention is directed to a system and method for parameter based visual characteristic control. The system includes input means adapted for receiving image data representative of at least one visual characteristic of an associated image. The system further includes means adapted for storing data representative of a selected polynomial relationship. The system still further includes storage means adapted for storing at least one selected constant value associated with the selected polynomial relationship, which constant values are chosen so as to define at least one curve associated with the selected polynomial relationship. The system also includes calculating means adapted for calculating an output value in accordance with the selected polynomial relationship, stored constant values, and received image data.

12 Claims, 6 Drawing Sheets

SYSTEM AND METHOD FOR OPTIMIZING IMAGE OUTPUT QUALITY

BACKGROUND OF THE INVENTION

The present invention relates generally to document processing operations and, more particularly, to a system and method for parameter based visual characteristic control.

For example, in a typical laser printer, rollers pull a sheet of paper from a tray and through a "charge roller," which gives the paper an electrostatic charge. At the same time, a printing drum is given an opposite charge. The surface of the drum is then scanned by a laser, discharging portions of the drum surface, leaving only those points corresponding to the desired text and image with a charge. This charge is then used to adhere toner to the drum surface. The paper and the drum are then brought into contact, the differing charges causing the toner to adhere to the paper. The paper then travels between "fusing rollers" which heat the paper and melt the toner, fusing the toner to the paper.

Corresponding process occur in direct deposition printers, such as dot matrix printers, inkjet printers, and the like.

A printer suitably adjusts image contrast by applying a "contrast curve" to image data prior to printing therefrom. A shape of the contrast curve is determined by a "contrast setting," typically a number ranging from −100 to +100. By way of example, a setting of 0 results in no change in the image, while settings less than zero reduce contrast and settings greater than zero increase contrast.

Increasing contrast increases the differences between light and dark portions of an image so that light areas become lighter and dark areas become darker. Decreasing contrast reduces these differences. By manipulating contrast in this way, users can improve the quality of the images.

Contrast curves are typically implemented through a look up table (LUT) that relates input and output pixel values between input image data and adjusted, output image data. Input and output pixel values are often normalized in the LUT such that their values range between 0 and 1. When so normalized, 0 suitably represents pure black and 1 suitably represents pure white.

In keeping with the above example, the LUT is used to change the magnitude of the charge, thereby increasing or decreasing contrast. As also described above, the input values relate to the image, while the output values are the application of the curve to the image that is, in turn, printed by the printer. Thus, by changing the characteristics of the LUT and use thereof, a user selects a desired contrast.

However, use of such a large population of individual LUTs for contrast adjustment is not without drawbacks. For example, the use of a LUT that contains values for numerous contrast levels involves the storage of considerable amounts of data, and the storage and processing of such large amounts of data becomes burdensome. Further, such a population of pre-defined LUTs is inflexible. In a similar manner, by manipulating the transfer characteristics, the entire image can be made lighter or darker.

Thus, there exists a need for a system and method that uses a simple arithmetic function for setting parameters that can lighten, darken, enhance or reduce contrast.

SUMMARY OF THE PRESENT INVENTION

The present invention is directed generally to a system and method for parameter-based visual characteristic control. More specifically, the invention teaches an equation-based solution adapted for light-dark and contrast control.

In accordance with the present invention, there is provided a system for parameter-based visual characteristic control. The system comprises input means adapted for receiving image data representative of at least one visual characteristic of an associated image. The system further includes means adapted for storing data representative of a selected polynomial relationship. The system still further includes storage means adapted for storing at least one selected constant value associated with the selected polynomial relationship, which constant values are chosen so as to define at least one curve associated with the selected polynomial relationship. The system also includes calculating means adapted for calculating an output value in accordance with the selected polynomial relationship, stored constant values, and received image data.

Further in accordance with the present invention, there is provided a method for parameter based visual characteristic control. The method includes receiving image data representative of at least one visual characteristic of an associated image. The method further includes storing data representative of a selected polynomial relationship and storing at least one selected constant value associated with the selected polynomial relationship, which constant values are chosen so as to define at least one curve associated with the selected polynomial relationship. The method also discloses calculating an output value in accordance with the selected polynomial relationship, stored constant values, and received image data.

Additional advantages and novel features of the invention will be set forth in part in the description which follows, and in part will become apparent to those skilled in the art upon examination of the following or may be learned by practice of the invention. Such advantages of the invention may be realized and attained by various structures and methods as covered by the patent claims and the equivalents thereto.

BRIEF DESCRIPTION OF THE DRAWINGS

The accompanying figures incorporated in and forming a part of the specification, illustrates several aspects of the present invention, and together with the description serve to explain the principles of the invention. In the figures.

$$OUT = A + B * IN^{(IN*C+D)}$$

in accordance with principles of a preferred embodiment of the present invention which increase and decrease brightness without clipping.

Figure 2:
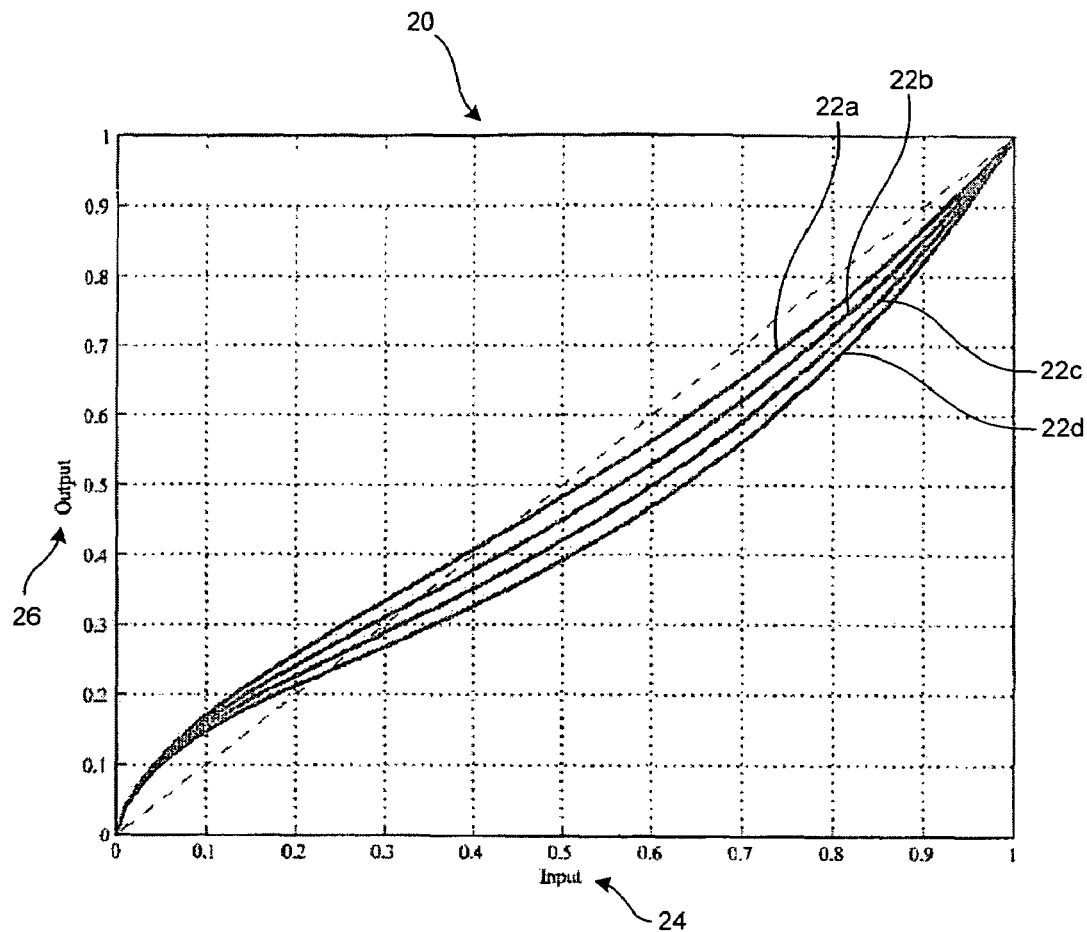

FIG. 2 is an illustration of a family of curves of Equation 1 for inverse "S" curves that decrease the contrast of images without clipping the input signal.

Figure 3:
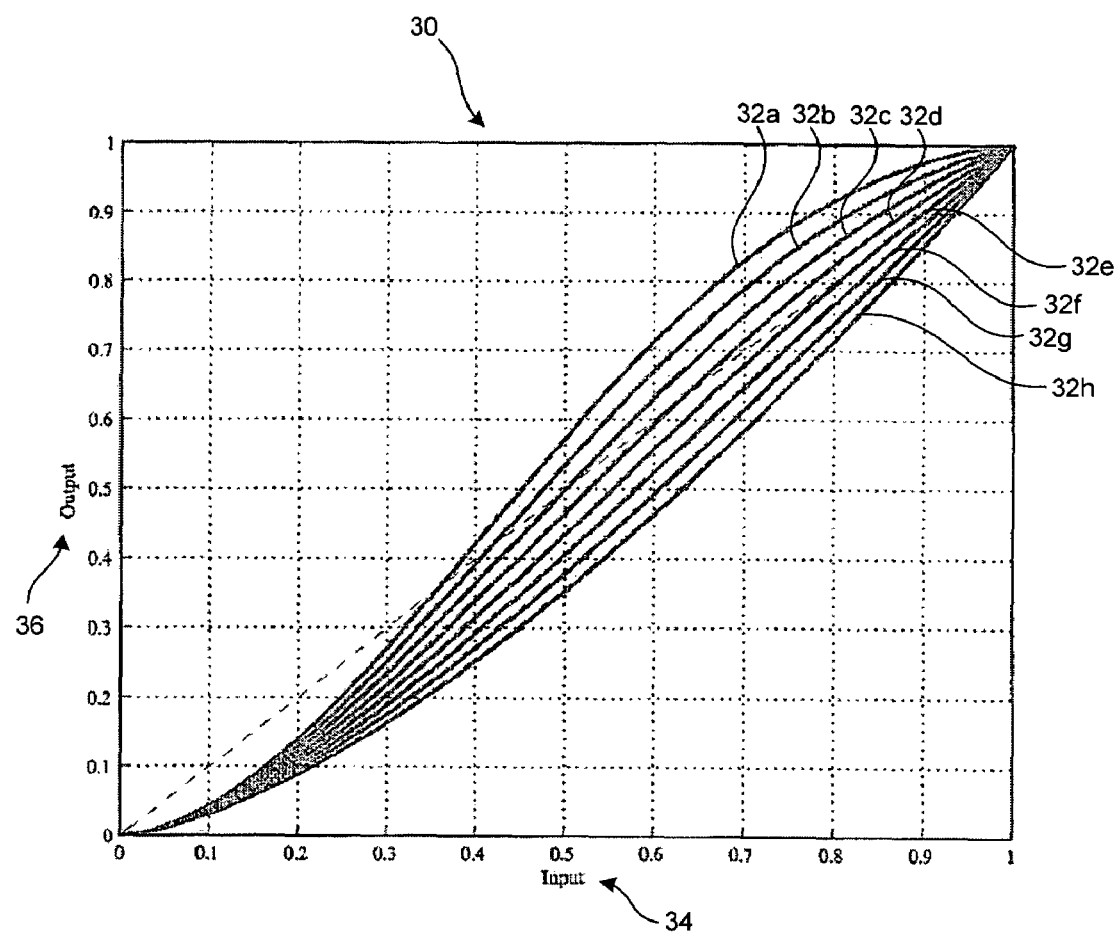

FIG. 3 is also an illustration of a family of curves of Equation 1 for "S" shaped curves that increase contrast without clipping the input signal.

Figure 4:
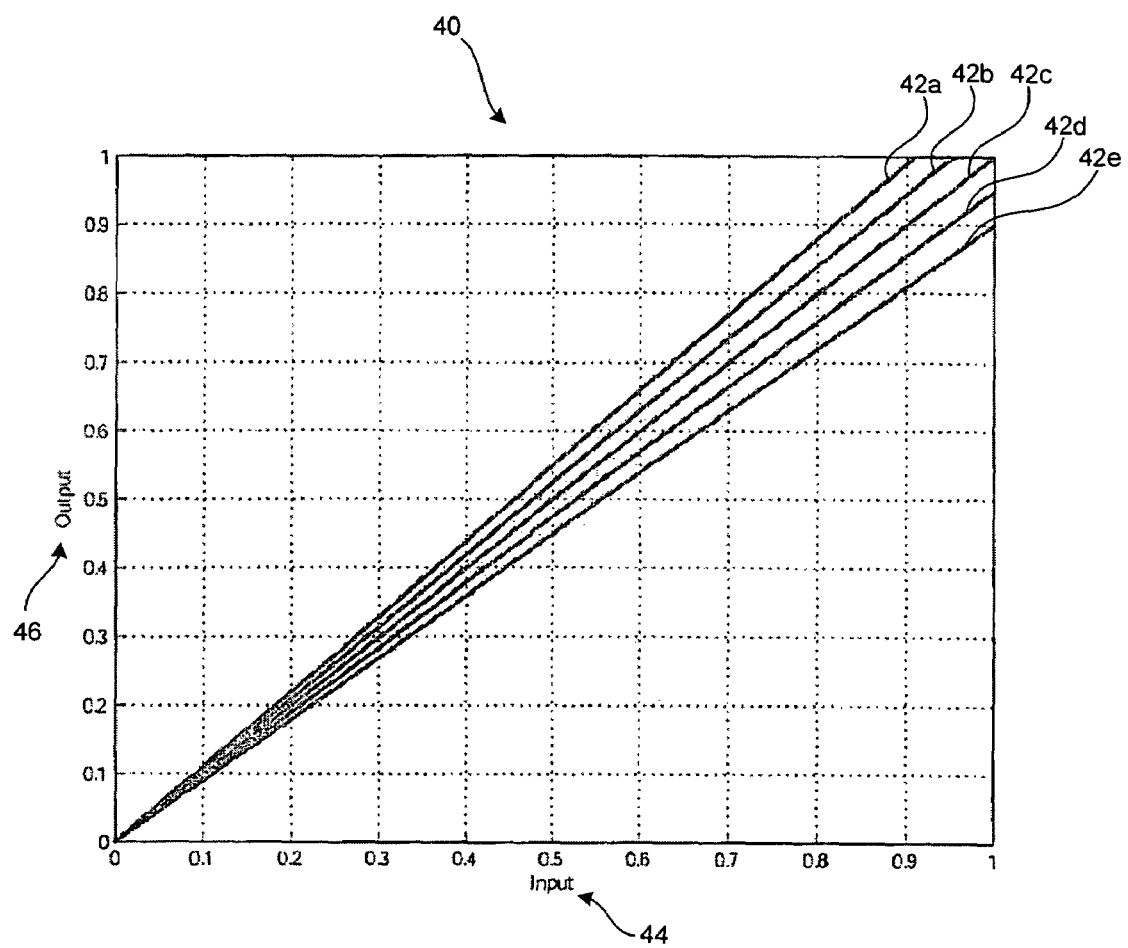

FIG. 4 is also an illustration of a family of curves of Equation 1 for curves that increase or decrease contrast with clipping.

Figure 5:
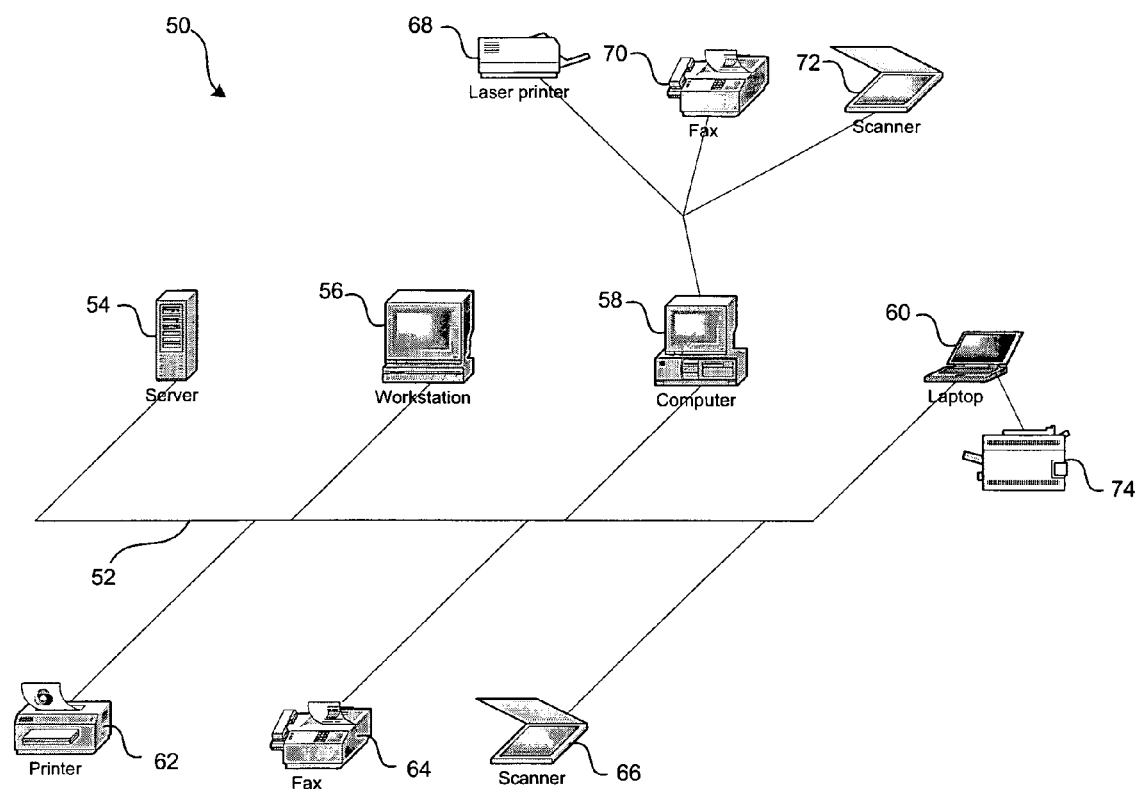

FIG. 5 is also an illustration of a family of curves of Equation 1 for curves that increase or decrease brightness with clipping.

Figure 6:
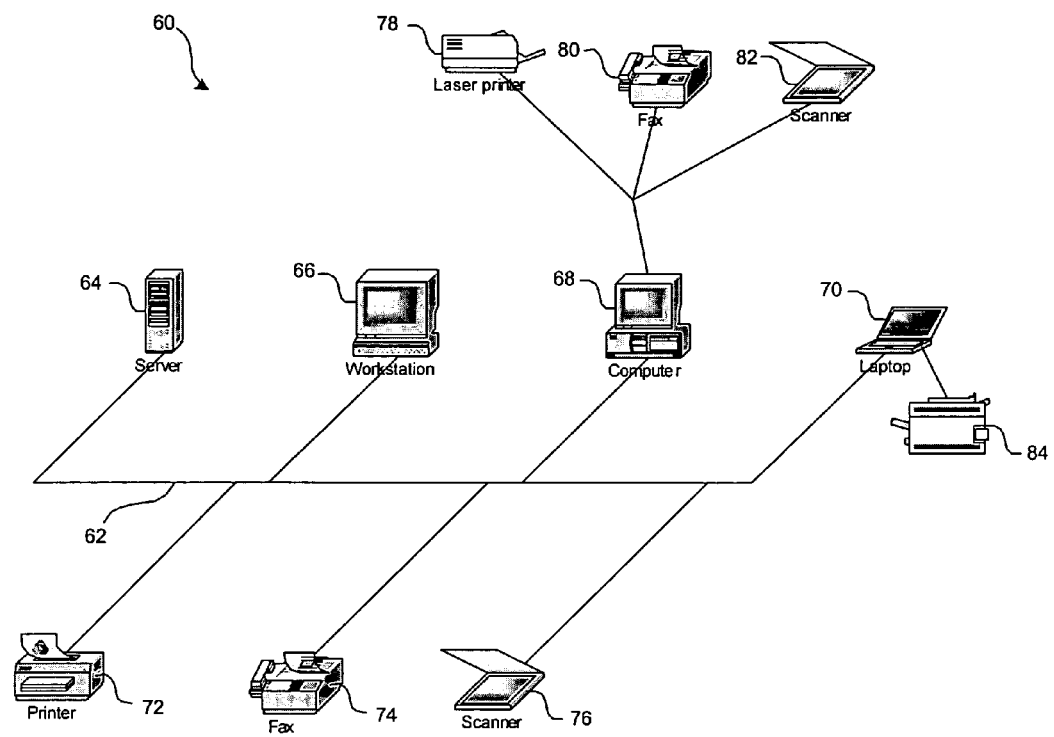

FIG. 6 is an illustration of an exemplary environment for the present invention.

DETAILED DESCRIPTION OF PREFERRED AND ALTERNATE EMBODIMENTS

The present invention is generally directed to a system and method for parameter-based visual characteristic control. More specifically, the invention provides a simple equation that is used for light-dark and contrast control.

Typically, the mathematical equation that is used to provide a contrast curve is fixed in nature and there is no ability to change the curve other than for differences in contrast. Similarly, the look up table (LUT) that is used to allow the look up of various contrast levels is also fixed in nature. Further, the LUT includes considerable amounts of data and the storage and processing of such data becomes burdensome. In contrast, the present invention uses a polynomial relationship with selected constant values to define a wide range of LUTs, one of which is then used for parameter based visual characteristic control, e.g., light-dark and contrast control.

Figure 1:
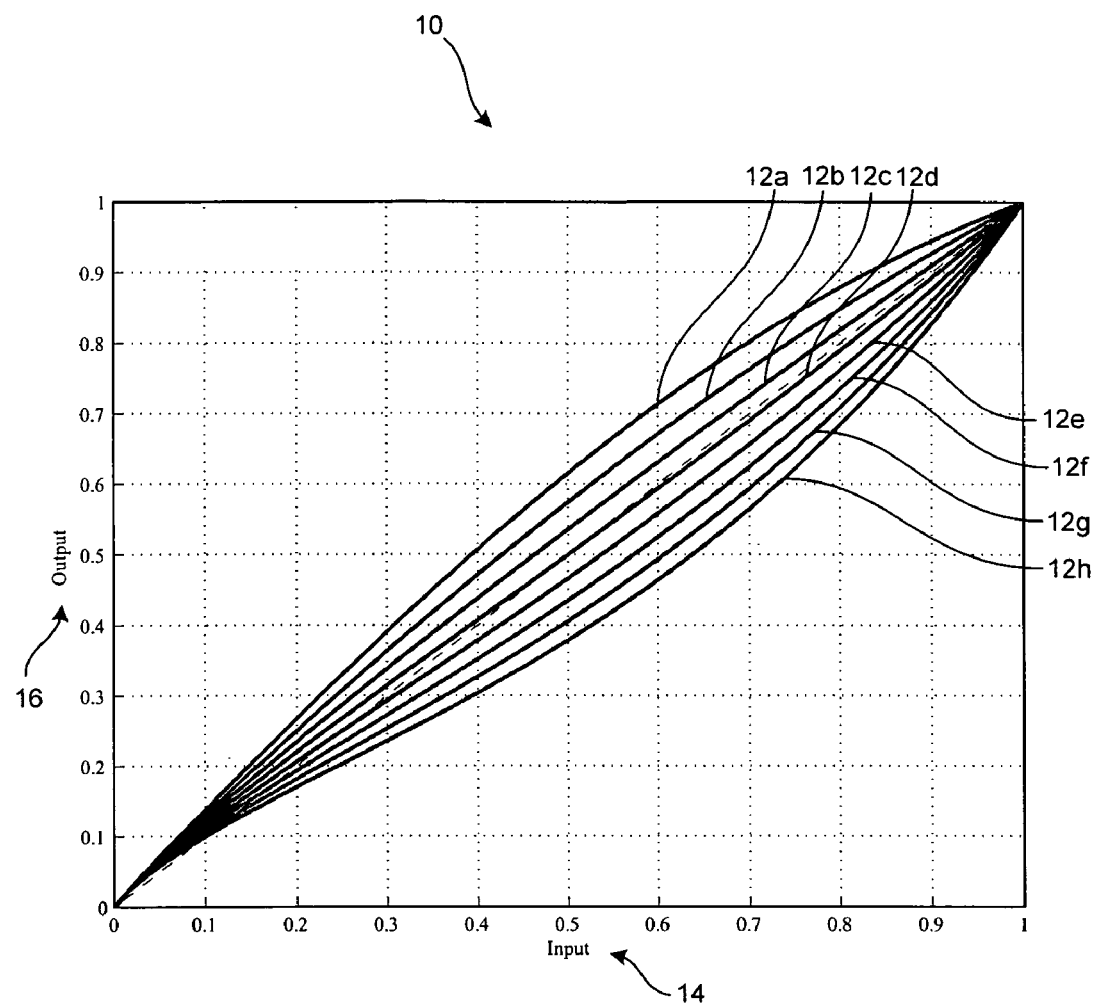
FIG. 1 is an illustration of a family of curves of the Equation 1.

For example, turning to FIG. 1, there is shown a family of curves 12*a-h* of the equation:

$$OUT = A + B * IN^{(IN*C+D)}.$$

As also shown, number system 10 for OUT and IN are normalized or scaled from 0 to 1, the input (IN) being shown on the abscissa or x-axis 14 and the output (OUT) being shown on the ordinate or y-axis 16, respectively. If the input 14 to system 10 is variable IN and the output is OUT, constant values A, B, C, and D will advantageously alter the curves 12*a-h* in a manner as shown. Thus, by specifying constant values A, B, C, and D, a number of LUTs may be realized. It is to be appreciated that the subject system is particularly suited for populating a LUT in accordance with selected values applied to a selected equation. It is to be further appreciated that, in the alternative, a plurality of LUTs may be pre-populated with selected values calculated from an equation. Or, it is also contemplated that, with sufficient calculating power, values are suitably calculated on-the-fly to complete an adjustment. Such a LUT based on specified constants is suitably used for light-dark and contrast control. There is no need to store large amounts of data associated with multiple contrast levels. Rather, only constant values, e.g., A, B, C, and D, need be stored and a LUT generated there from using the forgoing equation to provide parameter based visual characteristic control.

Some examples of changing some of the constants follow. First, for A=0, B=1, and D=0, the equation simplifies to:

$$OUT = IN^{(IN*C)}.$$

As shown in FIG. 1, for A=0, B=1, D=0.9, and C=−0.1:0.2: 1.0, 0.2, and 1 in succession, curves 12*a* through 12*h* are respectively shown. It will be understood by one skilled in the art that C begins at −0.1 and ranges to 1.0 by increments of 0.2. The skilled artisan will further appreciate that C=−0.1 is illustrated as the top curve in FIG. 1 and that C=1.0 is shown as the bottom curve of FIG. 1.

Turning to FIG. 2, an example of a suitable family of curves 22*a-d* of the equation of FIG. 1 for inverse "S" curves that will decrease the contrast of images are shown. Similarly, number system 20 for OUT and IN are scaled from 0 to 1, the input (IN) being shown on the horizontal axis 24 and the output (OUT) being shown on the vertical axis 26. If the input 14 to system 10 is variable IN and the output is OUT, the constant values are A=0, B=1, D=0.7, and C=0.7:0.2:1.3 in succession, curves 22*a*, 22*b*, 22*c* and 22*d* are respectively shown. The skilled artisan will appreciate that in FIG. 2, C=0.7 is the top curve shown and C=1.3 is the bottom curve as illustrated in FIG. 2.

Turning now to FIG. 3, a family of curves 32*a-h* of the equation of FIG. 1 for "S" shaped curves that increase contrast without clipping the input signal are shown. Likewise, number system 30 for OUT and IN are scaled from 0 to 1, the input (IN) being shown on horizontal axis 34 and the output (OUT) being shown on the vertical axis 36. For similar constant values, family of curves 32*a-h* results. The skilled artisan will appreciate that in the exemplary embodiment shown in FIG. 3, the constant values used are: A=0.0, B=1.0, C=−1.4:0.2:0.0, D=1.5, wherein C=−1.4 is shown as the top curve of FIG. 3 and C=0 is shown as the bottom curve of FIG. 3.

Turning now to FIG. 4, a representative family of curves 42*a-e* of the equation of FIG. 1 for curves that increase or decrease contrast with clipping is shown. While, clipping, as evidenced by the curves, is not typically desirable, a small amount of clipping is often acceptable for some images. In a similar manner, coordinates 40 for OUT and IN are scaled from 0 to 1, the input (IN) being shown on horizontal axis 44 and the output (OUT) being shown on the vertical axis 46. For example, for A=0, C=0, D=1, and B=0.9:0.05:1.1, curves 42*a*, 42*c*, and 42*e* respectively result. The skilled artisan will appreciate that B=1.1 is illustrated as the top curve of FIG. 4 and B=0.9 is illustrated as the bottom curve of FIG. 4.

With reference now to FIG. 5, a representative family of curves 52*a-k* of the equation of FIG. 1 for curves that increase and decrease brightness with clipping is shown. As previously stated, clipping is not typically desirable, however a small amount of clipping, as shown in FIG. 5, is acceptable in some circumstances. In a similar manner, coordinates 50 for OUT and IN are scaled from 0 to 1, the input (IN) being shown on horizontal axis 54 and the output (OUT) being shown on the vertical axis 56. For example, for A=−0.1:0.02:0.1 and B=1.0, C=0.0, and D=1.0, curves 52*a*, 52*f*, and 52*k* respectively result. The skilled artisan will appreciate that when A=−0.1 the bottom curve of FIG. 5 results and when A=0.1 the top curve of FIG. 5 results.

It will be appreciated by those skilled in the art that the foregoing parameters, A, B, C, and D, are advantageously set in the printer, or MFP driver, via a common user interface. In one exemplary embodiment, sliders are available to the user that change, e.g., referring to FIG. 3, the value of C. A visual appearance of the image is then suitably displayed to the user, thereby illustrating the effects of this change. When the change is satisfactory to the user, the user then prints the image. The parameter for C is then passed to the image processing stage, which, for example when using a PDL (PostScript or PCL), occurs in the printer itself, or in case of a GDI, occurs on the host computer.

Turning to FIG. 6, an illustration of an exemplary environment 60 for the present invention is shown. Environment 60 generally comprises network 62 for connecting or networking various computers and document processing devices. For example, and as shown, a server 64, a workstation 66, a personal computer or, simply, a computer 68, and a laptop computer 70 are networked using network 62. Further, document processing devices such as, for example, a printer 72, a facsimile machine or fax 74, and a scanner 76 are also networked. Printer 72 is suitably a dot matrix printer, an inkjet printer, or the like.

Alternatively, or in addition, document processing devices can be coupled to a server, a workstation, a computer, a laptop computer, etc. For example, a laser printer 78, a fax 80, and a scanner 82 are coupled to computer 68. Moreover, a document processing device can combine multiple functions such as those of a printer, a fax, and/or a scanner. One multifunction peripheral (MFP) that combines the functions of printing, faxing and scanning is shown at reference numeral 84, and is coupled to laptop computer 70.

Document processing devices such as, for example, printer 72, fax 74, scanner 76, laser printer 78, fax 80, scanner 82, and multifunction peripheral 84 generally include a controller or processor and an associated memory. In use, the present teachings contemplate that such a controller, along with the associated memory, would receive image data representative of at least one visual characteristic of an image. The memory would suitably store data representative of a polynomial relationship and constant values associated with the polynomial relationship. The constant values define a contrast curve associated with the polynomial relationship. The controller would then calculate an output value in accordance with the received image data, polynomial relationship, and the stored constant values.

Thus, as will be appreciated by those of ordinary skill in the art, the present system teaches a selected polynomial and at least one selected constant value associated with the polynomial to define at least one curve that is used to provide visual characteristic control, such as, for example, light-dark and contrast control.

The foregoing description of preferred embodiments of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed:

1. A system for parameter based visual characteristic control comprising:
   input means adapted for receiving image data representative of at least one visual characteristic of an associated image, wherein the image data is inclusive of data representative of at least one of intensity and contrast of the associated image;
   means adapted for storing data representative of a selected polynomial relationship;
   storage means adapted for storing at least one selected constant value associated with the selected polynomial relationship, which constant values are chosen so as to define at least one curve associated with the selected polynomial relationship;
   calculating means adapted for calculating an output value in accordance with the selected polynomial relationship, stored constant values, and received image data;
   wherein the output value includes a corresponding value thereof as modified by the calculating means; and
   wherein input data is represented by IN, the output value is represented by OUT, and wherein the at least one selected constant value is represented by C, and wherein the selected polynomial relationship is in the form of:

$$OUT=IN^{(IN*C)}.$$

2. The system for parameter based visual characteristic control of claim 1, wherein additional selected constant values are represented by A and B, and wherein the selected polynomial is further defined in the form of:

$$OUT=A+B*IN^{(IN*C+D)}.$$

3. The system for parameter based visual characteristic control of claim 2, wherein:

$$-0.4 \leq C \leq 0.7.$$

4. A method for parameter based visual characteristic control, comprising the steps of:
   receiving image data representative of at least one visual characteristic of an associated image, wherein the image data is inclusive of data representative of at least one of intensity and contrast of the associated image;
   storing data representative of a selected polynomial relationship;
   storing at least one selected constant value associated with the selected polynomial relationship, which constant values are chosen so as to define at least one curve associated with the selected polynomial relationship;
   calculating an output value in accordance with the selected polynomial relationship, stored constant values, and received image data;
   wherein the output value includes a corresponding value thereof as modified by the calculating step; and
   wherein input data is represented by IN, the output value is represented by OUT, and wherein the at least one selected constant value is represented by C, and wherein the selected polynomial relationship is in the form of:

$$OUT=IN^{(IN*C)}.$$

5. The method of claim 4, wherein additional selected constant values are represented by A and B, and wherein the selected polynomial is further defined in the form of:

$$OUT=A+B*IN^{(IN*C+D)}.$$

6. The method of claim 5, wherein:

$$-0.4 \leq C \leq 0.7.$$

7. A computer-readable medium for parameter based visual characteristic control comprising:
   input means adapted for receiving image data representative of at least one visual characteristic of an associated image, wherein the image data is inclusive of data representative of at least one of intensity and contrast of the associated image;
   means adapted for storing data representative of a selected polynomial relationship;
   storage means adapted for storing at least one selected constant value associated with the selected polynomial relationship, which constant values are chosen so as to define at least one curve associated with the selected polynomial relationship;
   calculating means adapted for calculating an output value in accordance with the selected polynomial relationship, stored constant values, and received image data;
   wherein the output value includes a corresponding value thereof as modified by the calculating means; and
   wherein input data is represented by IN, the output value is represented by OUT, and wherein the at least one selected constant value is represented by C, and wherein the selected polynomial relationship is in the form of:

$$OUT=IN^{(IN*C)}.$$

8. The computer-readable medium of claim 7 wherein additional selected constant values are represented by A and B, and wherein the selected polynomial is further defined in the form of:

$$OUT = A + B * IN^{(IN*C+D)}.$$

9. The computer-readable medium of claim 8, wherein:

$$-0.4 \ddot{y} C \ddot{y} 0.7.$$

10. A computer implemented method for parameter based characteristic control, comprising the steps of:
   receiving image data representative of at least one visual characteristic of an associated image, wherein the image data is inclusive of data representative of at least one of intensity and contrast of the associated image;
   storing data representative of a selected polynomial relationship;
   storing at least one selected constant value associated with the selected polynomial relationship, which constant values are chosen so as to define at least one curve associated with the selected polynomial relationship;
   calculating an output value in accordance with the selected polynomial relationship, stored constant values, and received image data;
   wherein the output value includes a corresponding value thereof as modified by the calculating STEP; and
   wherein input data is represented by IN, the output value is represented by OUT, and wherein the at least one selected constant value is represented by C, and wherein the selected polynomial relationship is in the form of:

$$OUT = IN^{(IN*C)}.$$

11. The computer implement method for parameter based characteristic control of claim 10, wherein additional selected constant values are represented by A and B, and wherein the selected polynomial is further defined in the form of:

$$OUT = A + B * IN^{(IN*C+D)}.$$

12. The computer implemented method for parameter based characteristic control of claim 11, wherein:

$$-0.4 \ddot{y} C \ddot{y} 0.7.$$

* * * * *